United States Patent [19]
Gotoh et al.

[11] Patent Number: 5,824,392
[45] Date of Patent: Oct. 20, 1998

[54] METHOD OF PRODUCING AN AIR CUSHION AND AN APPARATUS FOR THE SAME

[75] Inventors: Shuichi Gotoh, Tokyo; Yukio Yamashita, Nagoya, both of Japan

[73] Assignee: Idemitsu Petrochemical Co., Ltd., Tokyo, Japan

[21] Appl. No.: 556,949
[22] PCT Filed: Mar. 24, 1995
[86] PCT No.: PCT/JP95/00540
  § 371 Date: Apr. 10, 1996
  § 102(e) Date: Apr. 10, 1996
[87] PCT Pub. No.: WO95/25681
  PCT Pub. Date: Sep. 28, 1995

[30] Foreign Application Priority Data

Mar. 24, 1994  [JP]  Japan ................................. 6/053680

[51] Int. Cl.$^6$ ............................... B32B 3/28; B32B 31/00
[52] U.S. Cl. ...................... 428/178; 428/166; 156/292; 156/308.4; 156/553
[58] Field of Search ................................ 428/178, 166, 428/188; 156/145, 272, 210, 285, 292, 322, 499, 553, 308.4; 206/538, 539; 264/171.26, 319, 167

[56] References Cited

U.S. PATENT DOCUMENTS 3,756,884  9/1973  Hagino ..................................... 428/178
4,287,250  9/1981  Rudy ....................................... 428/178
4,847,126  7/1989  Yanashiro et al. ....................... 428/178
5,143,775  9/1992  Olsson et al. ........................... 428/178

FOREIGN PATENT DOCUMENTS

89/06557  7/1989  WIPO .
92/19436  11/1992  WIPO .

OTHER PUBLICATIONS

P. 1 of European Patent No. EP 399 965 A3, dated Nov. 28, 1990, containing an English language abstract thereon; and a copy of the European Search Report attached thereto (2 pages).

English language abstract of Japanese Patent Application No. 5–4660, dated Jan. 14, 1993 (1 page).

*Primary Examiner*—Donald Loney
*Attorney, Agent, or Firm*—Flynn, Thiel, Boutell & Tanis, P.C.

[57] ABSTRACT

Two-ply films 23, 24 are sent and heat-fused in a longitudinal direction and a transverse direction on a heat drum-roller 30, furthermore, hollow bubble portions 63 with an air-leading groove 32 and bubble-forming depressions 33, provided on a circumferential surface of the heat drum-roller, and a communicating portion 62 going through sealed portions in the direction transverse to the longitudinal direction to make communication between the bubbles, are formed on the film, in order that each bubble is expanded by feeding into the hollow bubble portion 63 with air, sent from an air-blowing nozzle 40 through the communication portion 62, and then, the communicating portion 62 communicating the expanded bubbles is sealed with a point-seal 50. Therefore, an air cushion sheet 60 having plural independent bubbles 65 which are each formed in a large long type in the transverse direction is easily and certainly produced.

17 Claims, 6 Drawing Sheets

F I G. 2
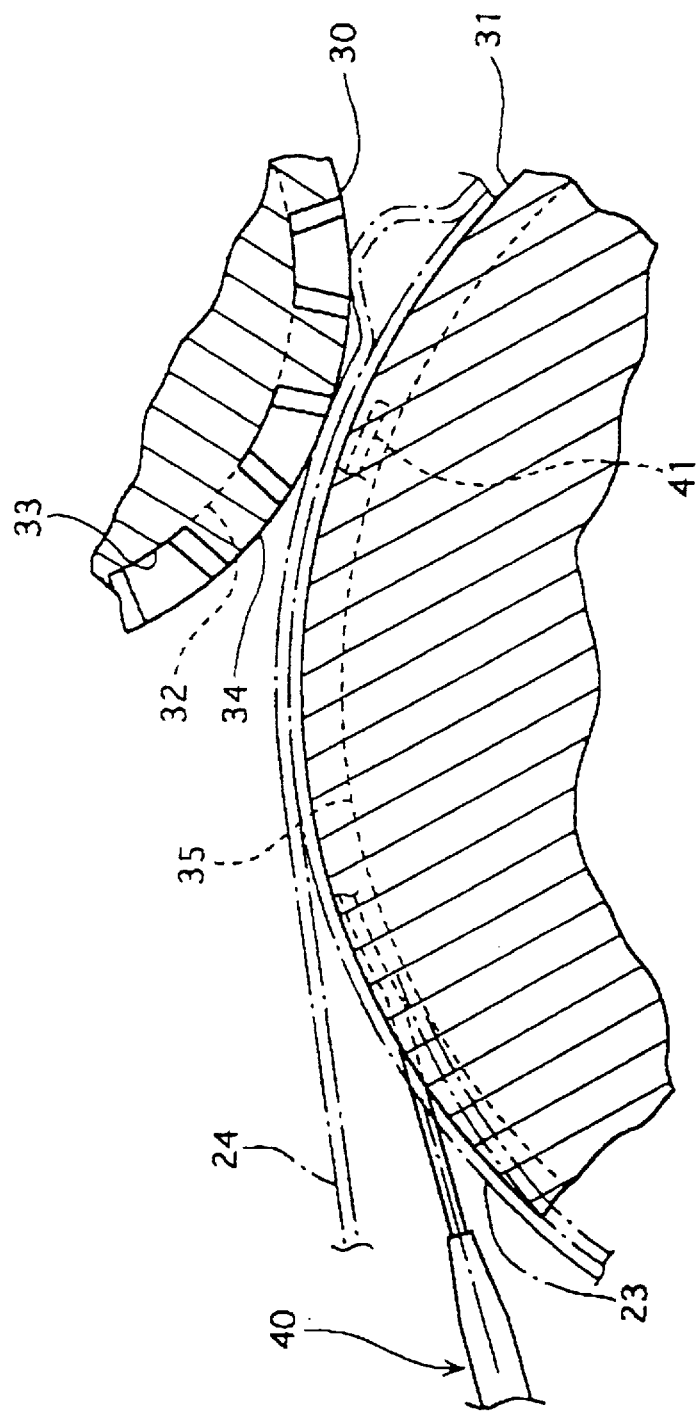

METHOD OF PRODUCING AN AIR CUSHION AND AN APPARATUS FOR THE SAME

TECHNICAL FIELD

The present invention relates to a method of producing an air cushion using air as a cushion, an apparatus for the same and the air cushion and, more particularly, to the method of producing the air cushion of a bubble type, formed by blowing air into a plastic-film tube, the apparatus for the same and the air cushion.

BACKGROUND ART

Conventionally, when the object required should avoid having damage in packing, for example, electrical equipment, equipment for office automation, a precision instrument and a work of art, is packed, a cushion has been stuffed in a packing box for the intention to protect the packed object from receiving damage in transit.

The aforementioned cushion material, foam plastic block and so on have been used for a long time.

However, lately, in view of the environmental problems, other cushion materials have been required instead of the foam plastic block which is difficult to dispose of.

Answering this requirement, an air cushion using air as a cushion, more particularly, the air cushion of a bubble type which is formed by blowing air into a plastic-film bubble has been used.

As the above air cushion, a pillow bubble type having an almost tube bubble, a tetrahedral bubble type having a regular tetrahedral bubble or the like is used.

In the production of the aforementioned air cushion of the bubble type, an automatic cushion-bubble production apparatus and so on are developed for a small bubble, in which small bubbles are formed to simultaneously blow air and seal because of its simple structure.

The following are known as the aforementioned art:
[1] Translated National Publication of Patent Application No. Hei 2-502986; a two-ply film is sent to a first roller to seat in a longitudinal direction, expanded into a tube shape by air blowing, sent to a second roller to seal in a direction transverse to the longitudinal direction, and finally, formed into plural bubbles divided by sealing in a lengthwise and transverse grid.
[2] European Patent No. 039 996 5A3: as the aforementioned [1], there are formed bubbles divided in the grid by sealing with a double stage roll.
[3] Translated National Publication of Patent Application No. Hei 5-508142: as basically the aforementioned [1], the bubbles divided in the grid by sealing in a double stage with a stamping type instead of the roll type in [1].
[4] Japanese Patent Application Laid-open No. Hei 5-4660: the bubbles divided in the grid are formed, in which a seal is formed to extend even in the direction transverse to the longitudinal direction in the first stage seal of the stamping type. And further, the bubble is extended by feeding with air through a non-sealing portion in the direction transverse to the longitudinal direction to each division, and in the end, closing the non-sealing portion.

In all the methods of the aforementioned [1] to [4], the film is sealed at the first stage in the film longitudinal direction (a sending direction), expanded by blowing air, and sealing at the second stage in the direction transverse of the film (a direction transverse to the longitudinal direction), whereby independent air bubbles are formed.

Specifically, in the aforementioned [1] to [3], a tube with air is formed to extend in the longitudinal direction, and the middle part of the tube is sealed by the direction transverse to the longitudinal direction seal to form the independent air bubbles. This method is commonly well-known. There is no disadvantage when the relatively small tetragonal bubble is formed.

Incidentally, the aforementioned [4] takes steps to seal on both sides of the film at the first stage (a heat-sealer 8), blow air into the film forming the tube, form the longitudinal direction seal for the width of each bubble line at the middle part in the film direction transverse to the longitudinal direction and also the direction transverse to the longitudinal direction seal having an unsealed intermission portion (a 15 type), and further seal the unsealed intermission portion of the direction transverse to the longitudinal direction seal at the third stage (a heat-sealer 16). Therefore, the seal strength in the direction transverse to the longitudinal direction is increased by the double stage seal which has an air-blowing passage which is limited in the second stage and then closed. But, as pointed out in [4] the direction transverse to the longitudinal direction is sealed after air is fed into the film sealed in the longitudinal direction, this is the same as the aforementioned [1] to [3].

However, the conventional art such as the [1] to [4] as described above has a disadvantage in which reliable bubbles can not be produced, more specifically, the need of a process, which the direction transverse to the longitudinal direction seal divides at the middle of the shaped tube expanded by air in the sending direction, caused the seal process to become difficult by the long seal measure in the direction transverse to the longitudinal direction (a disadvantage of difficulties in the direction transverse to the longitudinal direction seal in the air fed state).

And, the conventional art such as the [1] to [4] as described above has disadvantages hindering in automatization for the following reasons when the large bubble is formed.

First, the large air cushion used for a large heavy object and so on responds to the mass volume object by forming a lot of bubbles in a relatively thick film of one cushion sheet, so that the structure of the cushion is complicated (a disadvantage of structural complication when the large bubble is formed).

Second, since each bubble is formed to be larger for the large air cushion, it is difficult in the methods of the aforementioned [1] to [4] to form the bubble and blow air at the same time. For example, in the [1] to [4], the large bubble increase restitution by the inner air, so that it is difficult to seal suitably the direction transverse to the longitudinal direction with the film shaped in the tube. Therefore, the plural bubbles should be respectively fed with air by feeding with air in a different process from when the bubble is formed, thereby the producing process becomes complicated (a disadvantage of providing a separate process for the air feed when the large bubble is formed).

Third, the aforementioned complicated production results in greater production costs, because it is difficult to produce in a type which the film is consecutively fed from a film-roll and the structure of the automatic production apparatus for the large air bubble having the plural independent bubbles (a disadvantage of production complication when the large bubble is formed).

In addition, in the conventional art such as the [1] to [4] as described above, even the small bubble is formed to be in an almost rectangular shape having the same lengthwise and crosswise lengths or a rectangular shape having the longer lengthwise length (in the sending direction), whereby it is a disadvantage that the processed film is difficult to wind up.

More specifically, the film which forms bubbles can be easily managed by, for example, winding up in the longitudinal direction (the sending direction in production). But if the produced air cushion is attempted to wind up in the sending direction (the longitudinal direction), the long bubble in the longitudinal hinders the winding of the air cushion, so that there is a disadvantage in which the fine winding state is inferior (a disadvantage of the winding state in the bubble direction).

When the direction transverse to the longitudinal direction seal is performed to the tube-like film expanded by air as described above, even a small bubble is formed on the film, the fine sealing state cannot be obtained by the difficult operation so as not to avoid having the possibility of occurrence of the inferior seal (a disadvantage in the direction transverse to the longitudinal direction seal).

Consequently, although the request of the winding process as described above is strongly desired, actually, its practicability is behind.

It is the first object of the present invention to provide the method for producing the air cushion and the apparatus for the same, in which they are capable of producing the air cushion having a fine seal and producing an air cushion at small cost, that can be processed easily, although the air cushion is of a large elongate type in a direction transverse to the longitudinal direction.

It is a second object of the present invention to provide the air cushion capable of easily winding up in the longitudinal direction.

DISCLOSURE OF THE INVENTION

The present invention is intended to achieve the first object by making unnecessary use of a direction transverse to the longitudinal direction seal with films shaped in the tube as the aforementioned conventional art, in which a division to be a bubble is formed by using at least a pair of longitudinal direction seals (a longitudinal direction of the film) and further the longitudinal direction seals to seal between the longitudinal direction seals, and on this occasion, a communicating portion for an air hole is not sealed in a direction transverse to the longitudinal direction yet in order to simultaneously form the plural bubbles, later have to be fed with air through the communicating portion.

The present invention is intended to achieve the second object by forming the bubble to be extended in a direction transverse to the longitudinal direction of the air cushion.

The air cushion according to the present invention is characterized by having the two plastic films laying one on top of another in an elongate state, the longitudinal direction seals and the transverse direction seals extending respectively in the longitudinal direction and the transverse direction of the plastic films to be adapted to connect the two films with one another in a fused state, and each of the bubbles formed on the inside enclosed with the longitudinal direction seals and the transverse direction seals to be expanded by air filled therein, which the bubbles have their length measure in the film transverse direction of over twice its diameter measure in the film longitudinal direction.

According to the aforementioned structure, when the film is wound up in the longitudinal direction, each bubble has a longer length in the transverse direction, so that the film can certainly be wound up from the core of the winding portion without hindrance.

The aforementioned air cushion can easily and certainly be produced by the following method and apparatus for producing the air cushion.

The method for producing the air cushion according to the present invention is characterized by including a process for sending continuously the two plastic-films and for forming at least a pair of the longitudinal direction seals, heat-fused to one another during delivery, which extend in the operational direction of the film and the transverse direction seals, having partly unsealed intermittent portions, which extend in the transverse direction of the film, a process for blowing air from the feeding cylinder side of each film through the intermittent portions in order to cause each division, enclosed with the longitudinal direction seals and the longitudinal direction seals, to be expanded by filling air therein, and a process for closing the intermittent portions in the film expanded by air in order to form an independent bubble at each division enclosed with the longitudinal direction seals and the transverse direction seals.

According to the aforementioned method for producing, since at least a pair of the longitudinal direction seals and the transverse direction seals are operated in a non-expanding state before air is blown, each seal is certainly operated. The independent bubble is formed by closing the intermittent portion in an expanded state of the bubble by blowing air from the intermittent portion. At the time of forming the bubble, the intermittent portion can be closed over a short distance, whereby it is then easy to secure a reliable seal.

In the method for producing, it is preferable to seal supplementary to extend in an axial direction of the film from the longitudinal direction seals to the ends of the intermittent portions when the longitudinal direction seals are formed. Therefore, the accuracy of the sealing position is eased when the intermittent portion is closed, so that the sealing strength can be increased.

The bubbles may be sealed across the bubbles in a longitudinal direction to divide the bubbles into the plural number when the intermittent portions are closed. As a result, the size of the divided bubble can be simply selected.

It is preferable that the bubbles have their length measured in the film transverse direction that is over twice its diameter measured in the film operating direction.

It is preferable that a heat drum-roller having a non-welding groove (an air-leading groove) continuously cycled in a circumferential direction is used to correspond to the intermittent portions on a circumferential surface when the longitudinal direction seals and the transverse direction seals are carried out. And, the continuity of the production process effects improvement of the efficiency.

Furthermore, the aforementioned method for producing may be adapted to form a bubble portion from the lateral direction seal and the longitudinal direction seal in both sides of the intermittent portion defined as a cycle of a passage.

More specifically, the method for producing may facilitate to form the hollow bubble portions one after another, extending in the transverse direction of the film unitedly attached by heat-fusing the two plastic films during continuous delivery, and form communicating portions extending in a continuous direction of the film so as to communicate at conjunction with each bubble portion, to blow air into the communicating portion so as to expand each bubble communicating with the communicating portion by air filled therein, and to heat-fuse the communicating portion of the film filled with air so as to close each bubble portion.

It is preferable to, when the heat-fusion is carried out, to use the heat drum-roller having plural bubble-forming depressions extending in an axial direction of the circumferential surface and the non-welding groove (the air-leading groove) continuously cycled in the circumferential direction to communicate in conjunction with the bubble-forming depressions.

The apparatus for producing the air cushion according to the present invention is characterized by having a film-feeding means for feeding consecutively the two plastic films, a first heat-fusion means for forming at least a pair of the longitudinal direction seals extending in the operating direction of the film in which the two films consecutively fed are heat-fused with one another forming the transverse direction seals extending in the transverse direction of the film and having the intermittent portions partly unsealed, an air-blowing nozzle for blowing air from the feeding cylinder side of each film through the intermittent portions so as to cause each division enclosed with the longitudinal direction seals and the transverse direction seals to be expanded by filling air therein, and a second heat-fusion means for heat-fusing to close the intermittent portions in the film expanded by air so as to form the independent bubble at each division enclosed with the longitudinal direction seals and the transverse direction seals.

In the aforementioned apparatus for producing, it is preferable that the second heat-fusion means is of the heat drum-roller having the non-welding groove (the air-leading groove) continuously cycled in the circumferential direction to correspond to the intermittent portions on a circumferential surface and depressions relative to the air bubbles.

Furthermore, the aforementioned method for producing may be adapted to form a bubble portion from the lateral direction seal and the longitudinal direction seal in both sides of the intermittent portion defined as a cycle of a passage.

More specifically, the method for producing may include the film-feeding means for consecutively feeding the two plastic-films, the first heat-fusion means for forming a plural of the hollow bubble portions which are extended in the transverse direction of the film, united by heat-fusing two consecutively fed films and are arranged in a continuous direction, and for forming the communicating portion communicating with each bubble portion in conjunction to extend in the continuous direction of the film, the air-blowing nozzle for blowing air into the communicating portion so as to cause each bubble portion communicating with the communicating portion to be expanded by filling air therein, and the second heat-fusion means for heat-fusing the communicating portion of the film fed with air to close each bubble portion.

It is preferable that the first heat-fusion means may be of the heat drum-roller having the plural bubble-forming depressions extending in an axial direction of the circumferential surface and the non-welding groove (the air-leading groove) continuously cycled in the circumferential direction so as to communicate in the conjunctions with the bubble-forming depressions.

It is preferable that the bubble-forming depressions are formed to have a narrower width of parts communicating with the non-welding groove (the air-leading groove) than other parts of the bubble-forming depressions.

The air cushion of the present invention is adapted to consecutively form the tube-like bubbles having the length of the bubble (the measure in the film direction transverse to the longitudinal direction) of over twice the diameter of the bubble (the measure in the film longitudinal direction). The diameter of the bubble usually is a range of 10–50 mm. The aforementioned tube-like bubble causes the air cushion to facilitate to be wound up and be packed with products or the like.

BRIEF DESCRIPTION OF THE DRAWINGS

FIG. 2 is an enlarged sectional view of a part of a heat drum-roller in the embodiment;

BEST MODE FOR CARRYING OUT THE INVENTION

Figure 1:
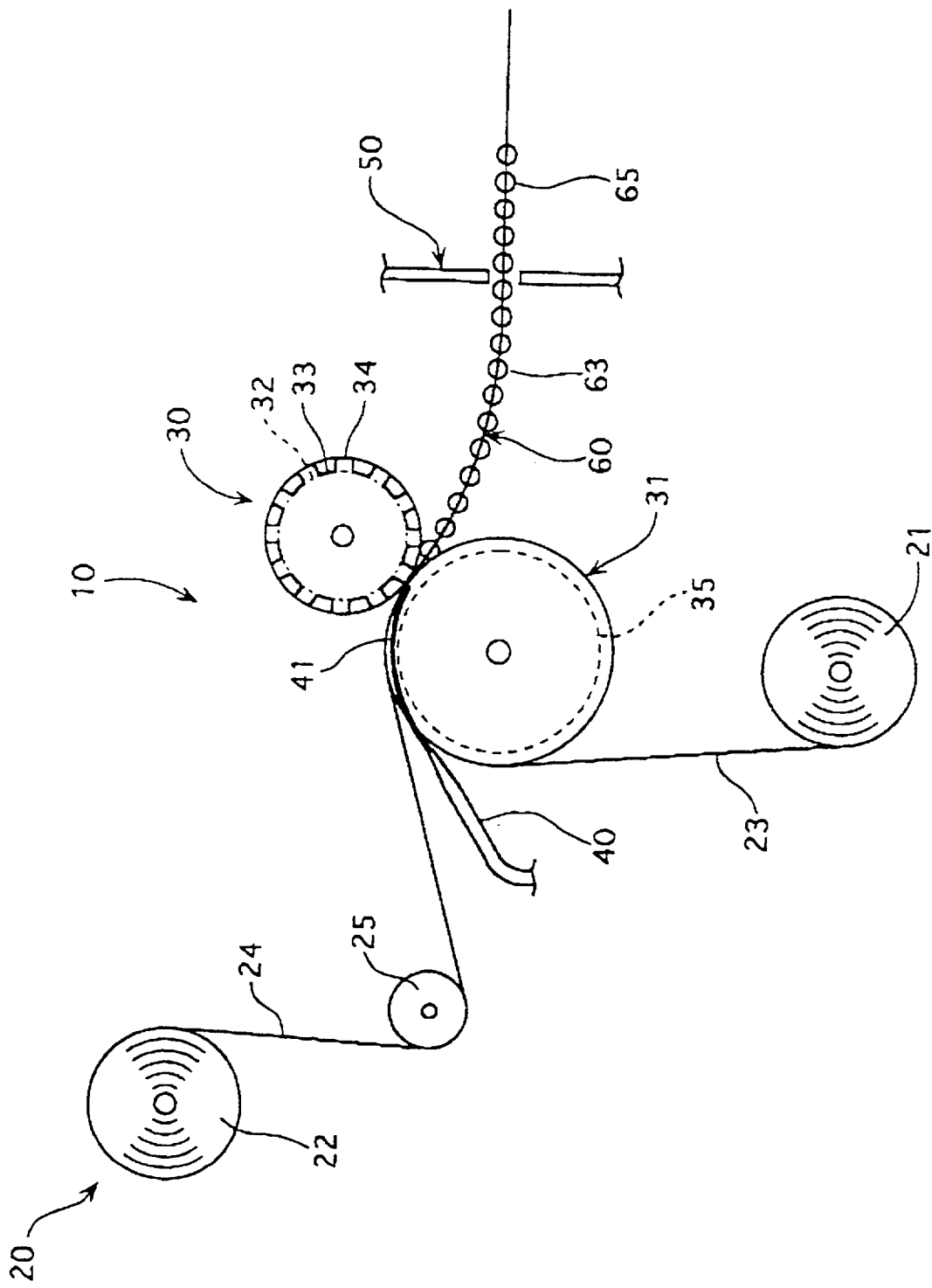
FIG. 1 is a diagrammatic side elevational view of an apparatus of a structure in an embodiment according to the present invention.

FIG. 1 shows an automatic production apparatus 10 for an air-cushion according to the present invention.

The automatic production apparatus 10 includes a film supply means 20, a heat drum-roller 30 and an application rubber-roller 31 as a first heat-fusion means, an air-blowing nozzle 40, and a point seal 50 as a second heat-fusion means.

The film supply means 20 has a pair of film-feeding cylinders 21 and 22 each wound with thermoplastic resin films 23 and 24. NYLON (the name of product) #15, LLDPE#60 or the like is used as the films 23, 24. The width of the film is 60 mm.

The film-feeding cylinder 21 is rotatably supported under the application rubber-roller 31. The film 23 drawn out from the roll 21 is sent through a circumferential surface of the application rubber-roller 31 to the right side in FIG. 1.

The other film-feeding cylinder 22 is rotatably supported by the application rubber-roller 31 on the left side in FIG. 1. The film 24 drawn out from the roll 22 is sent through a tension-roller 25 to the circumferential surface of the application rubber-roller 31 and further sent to the right side in FIG. 1 together the film 23 lying on the top of the other.

The heat drum-roller 30 is rotatably abutted to the application rubber-roller 31 on the upper right side in FIG. 1 across the films 23, 24, thereby the films 23, 24 are fused to one another by heat.

The heat drum-roller 30 is a cylindrical type being wider in axial direction than the films 23, 24 and is rotatably supported. The heat drum-roller 30 is heated from its inside by a heater (not shown) provided therein to be maintained at a predetermined temperature on its surface, so that the piled films 23, 24 sent onto its circumferential surface are heated until the predetermined fusing temperature is reached.

The application rubber-roller 31 is a cylindrical type whereby the axial direction is wider than the films 23, 24 and having a larger diameter than the heat drum-roller 30, and is rotatably supported. The application rubber-roller 31 is heated from its inside by a heater (not shown) provided therein to be maintained at predetermined temperature on its top surface, so that the piled films 23, 24 sent onto its circumferential surface are heated until the predetermined preheating temperature is softened up.

On the circumferential surface of the heat drum-roller 30, an air-leading groove 32 and bubble-forming depressions 33 are formed as a non-welding groove.

Figure 3:
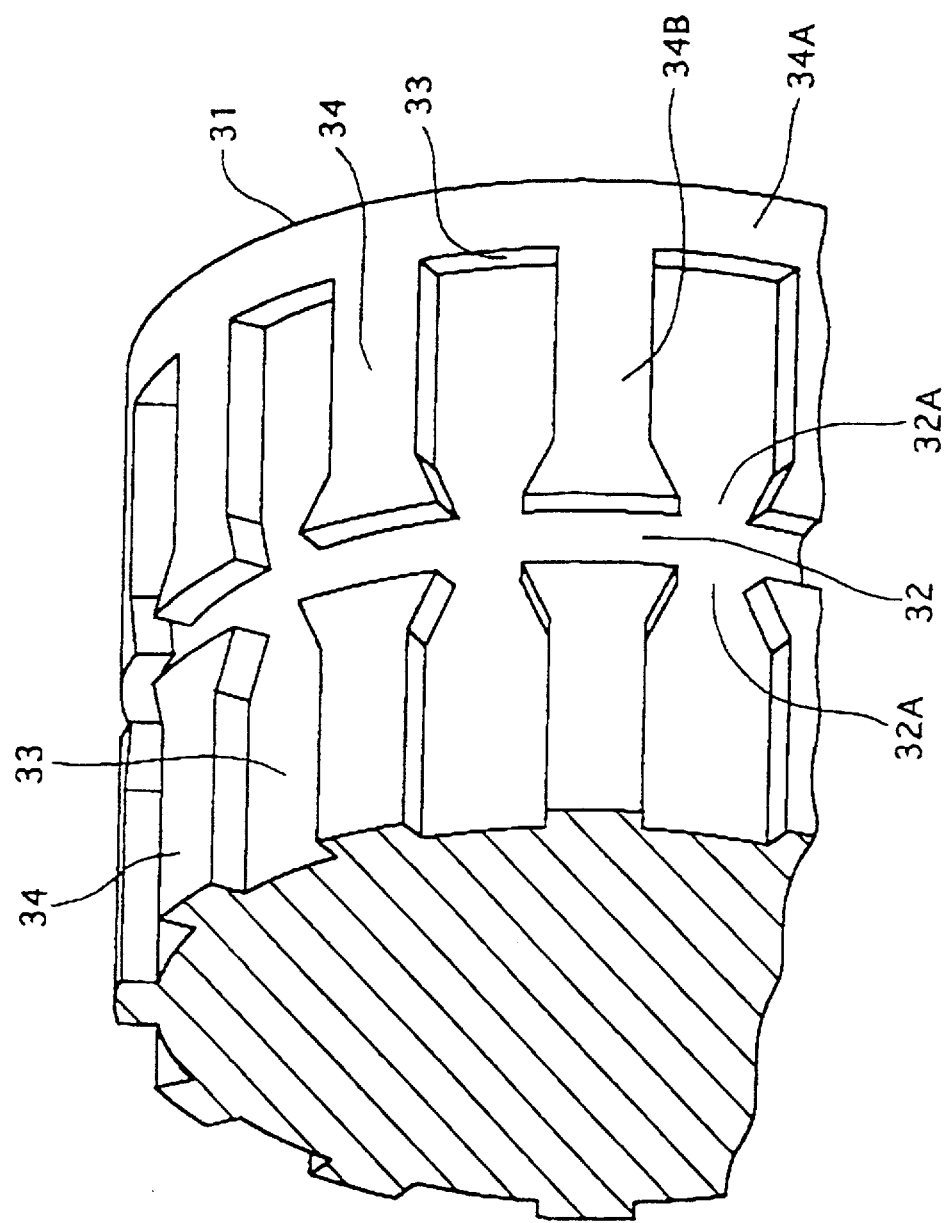
FIG. 3 is a fragmentary broken perspective view of a part of the heat drum-roller in the embodiment.

FIG. 2 is an enlarged sectional view of the heat drum-roller 30 and FIG. 3 shows an expanded view of a configuration of the circumferential surface of the heat drum-roller 30.

As shown in each drawing, the air-leading groove 32 is of a groove rounding on the central surface in the axial direction of the heat drum-roller 30 in a circumferential direction.

On the other hand, the bubble-forming depressions 33 are of an irregular depression extending in an axis of rotation direction of the heat drum-roller 30, and plural bubble-forming depressions 33 are arranged in a predetermined distance in the circumferential direction of the heat drum-roller 30, so that the rest of the surface of the heat drum-roller 30 (heights around the bubble-forming depressions 33) is connected as a seal portion 34 with the application rubber-roller 31 to seal the films 23, 24 with the heat-fusion.

The bubble-forming depressions 33 are communicated with one another through the air-leading groove 32 making conjunction with the depressions 33 arranged on the right and left sides of the air-leading groove 32.

Between the bubble-forming depressions 33 and the air-leading groove 32, there are communicating parts 32A having a narrower width than the other parts of the bubble-forming depressions 33.

Incidentally, the seal portion 34 is composed of a portion for a longitudinal direction seal 34A extending in the circumferential direction of the heat drum-roller 30 (in the rotational direction in the drawing) and a portion for a transverse direction seal 34B extending in the axis of rotation direction of the heat drum-roller 30 (in the rotational direction in the drawing). The portion for the transverse direction seal is interrupted by the air-leading groove 32, so that the communicating parts 32A form an intermittent portion of the transverse direction seal.

On the circumferential surface of the application rubber-roller 31, an air-leading groove 35 is formed as a continuous non-welding groove in the circumferential direction like the heat drum-roller 30.

The films 23, 24 applied to the circumferential surface of the application rubber-roller 31 are moderately softened by heat from the application rubber-roller 31 as the preparation for the heat-fusion is conducted by being pressed with the heat drum-roller 30.

Incidentally, the softening causes the part facing to the air-leading groove 35 in the side of the film 23 sent from under the application rubber-roller to be maintained in a lower state than the top circumferential surface of the application rubber-roller 31 so that the film is pulled down into the air-leading groove 35 little by little by the tension of the film 23.

The air-blowing nozzle 40 is inserted from between the two films 23 and 24 (where they begin to lie on top of one another) as they lay on top of one another on the top circumferential surface of the application rubber-roller 31 to inject compressed air fed from a feeding source of compressed air (non-shown) at a high pressure. A slenderly extended opening 41 of the nozzle 40 is extended along the air-leading groove 35 both through and between the film 23 sinking to the air-leading groove 35 and the film 24 on top of the film 23 to a connecting portion to the heat drum-roller 30 (see FIGS. 1 and 2).

The point-seal 50 as the second heat-fusion means is provided above and below the films to catch the two films 23 and 24 drawn after the heat-fusion by the heat drum-roller 30 and the application rubber-roller 31 and provided to be capable of heating until a redetermined fusing temperature of the films 23, 24 by a heater (not-shown), and of opening (a close interval in up and down) by a driving system (not-shown), whereby each forementioned intermittent portion is carried out by the heat-fusion process by pressing the films 23, 24 at the predetermined pressure and temperature.

The point-seal 50 is controlled to press at the chosen part of the films 23, 24 (a part corresponding to the conjunction of the air-leading groove 32 and the bubble-forming depressions 33 on the heat drum-roller 30) in the predetermined interval so as to heat fuse the films.

Incidentally, the point-seal 50 is used in the embodiment because of, relatively, the small size of the sealed intermittent portion, however, the second heat-fusion may be suitably used as a larger seal, a different shape seal, utilization for a part of another seal and so on. Briefly, the second heat-fusion may be a seal forming means or the like to be able to seal the intermittent portion in the films 23, 24.

In the embodiment as structured above, the films 23, 24 are drawn from the film-feeding cylinder 21, 22 of the film supply means 20, reaching each to the application rubber-roller 31 to lie on top of the other on the circumferential surface of the rubber-roller 31, advancing along the rotation of the application rubber-roller 31, engaging with the heat drum-roller 30 and pressing on the both circumferential sides.

Therefore, both films 23 and 24 are sealed with one another by heat-fusion in a shape in response to the seal portion 34 of the heat drum-roller 30 so as to be a united film (60). The united film sometimes will be called as a sheet 60.

Figure 4:
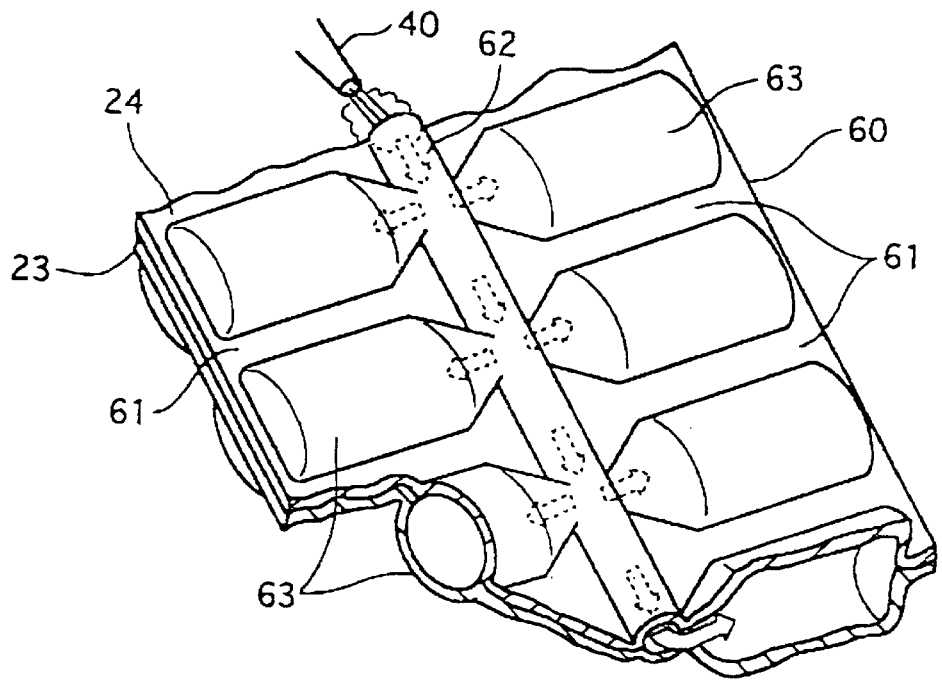
FIG. 4 is a fragmentary broken perspective view of a part of an air-cushion in a production process of the embodiment.

As shown in FIG. 4, in the sheet 60, the two films 23 and 24 are heat-fused at a portion 61 extending from the side of the sheet like the teeth of a comb, however, the other portions of the films corresponding to the bubble-forming depressions 33 and the air-leading groove 32 remain as a piled state without fusing with one another.

Therefore, portions corresponding to the air-leading grooves 32, 35 form a hollow-tubing communicating portion 62 extending at the center of the films 23, 24 in a continuous direction, and a portion corresponding to the bubble-forming depressions 33 forms plural hollow bubble portions 63 communicating with the right and left sides of the communicating portion 62.

In the above state, air is blown from the air-blowing nozzle 40 and is fed through the communicating portion 62 to each bubble portion 63 to be an expansive state. The expansive state is maintained in the sheet 60 sent from the heat drum-roller 30 by air blown continuously to the communication 62.

The sheet 60 is sent to the point-seal 50 in the expansive state of each bubble portion 63.

Figure 5:
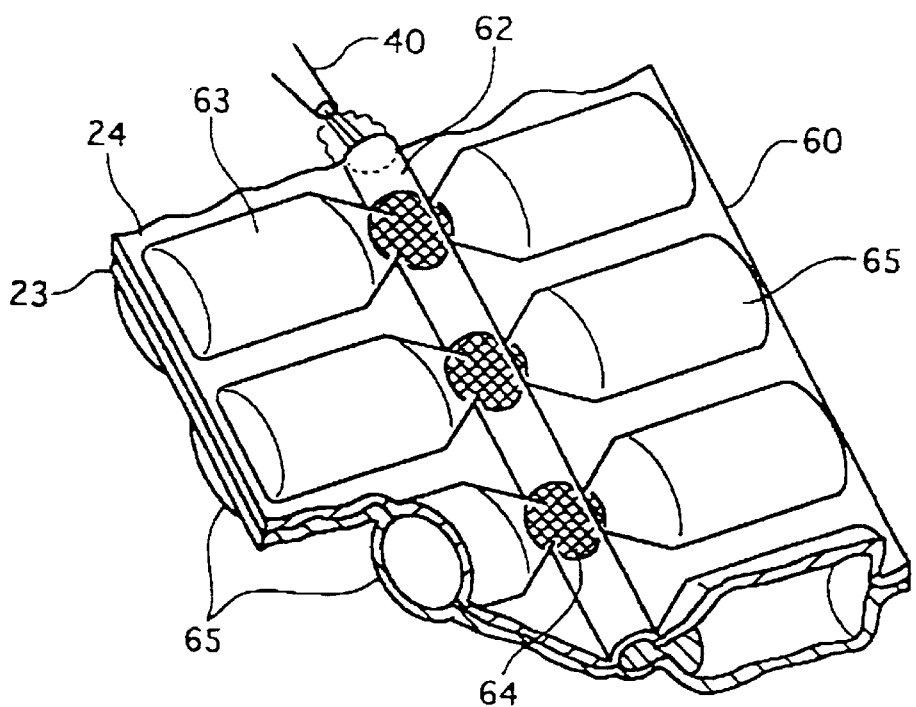
FIG. 5 is a fragmentary broken perspective view of a part of the air-cushion of the embodiment.

As shown in FIG. 5, the point-seal 50 heat-fuses the films to press at a communicating conjunction areas 64 of the communicating portion 62 and each bubble portion 63. Since the heat-fusion is performed at greater width than the communicating portion 62 and each bubble portion 63, the communicating portion 62 is closed and also each bubble portion 63 is closed, whereby each bubble portion 63 is to be an independent bubble 65.

Thus, the sheet is to be an air cushion having a lot of the independent bubbles 65 almost shaped into tubes. The length of the bubble in the transverse direction is defined as, usually, being at least twice that of the diameter measure (the length in an operating direction).

The sheet 60 as produced above is shipped with, for example, rolling up, if desired, cutting off at the predetermined distance to pile or the like.

When the sheet is cut off, since each bubble 65 is independently closed, the whole sheet is not influenced to shrink although the communicating portion 62 or the aligned bubbles 65 are cut off. And further, since the bubble is long in the transverse direction, the sheet 60 can be rolled up in the longitudinal direction without difficulty.

According to the embodiment, use of the plural bubble portion 63 fed with air from the communicating portion 62 causes the air cushion (the sheet 60) having the plural independent bubbles 65 to be continuously and automatically produced, whereby the production can be simplified.

Furthermore, in the embodiment, the sheet 60 is consecutively produced by using the continuous films 23, 24, so that the efficiency of the production can be progressed satisfactorily.

And, the progressing efficiency of the production can cause the cost of producing the sheet 60 (the air cushion) to be smaller.

Incidentally, it is attempted as a reference experimentation that the aforementioned piled films 23, 24 are heat fused at both edge ends and the sealed film is fed with air to its inside to be shaped into a tube extending in the direction of the films 23, 24, and then a partitioning seal over the full width is heat-fused in the transverse direction, with the result that the heat-fusion of the partitioning seal is affected because of the inside air pressure, so it is difficult that a lot of the independent bubbles can not be formed.

However, in the aforementioned embodiment according to the present invention, the portion heat-fused in the air fed state is a small area, that is the communicating conjunction area of the communicating portion 62 and each bubble portion 63, and further the communicating portion 62 or the communicating portion side of each bubble portion 63 is narrow, so that the point-seal 50 is not affected because of the inside air pressure. Furthermore, since the bubble 65 is preparedly formed by blowing air, the configuration of each bubble can be standard and uniform and the internal pressure can be increased. Consequently, the sheet 60 having the plural independent bubbles 65 can be certainly produced, whereby the effectiveness of the present invention is obvious.

In the embodiment, use of the heat drum-roller 30 causes the communicating portion 62 and the plural bubble portions 63 to be easily formed by the bubble-forming depressions 33 and the air-leading groove 32 formed on the heat drum-roller 30, whereby the producing efficiency is progressed much more.

And, the communicating parts 32A of the bubble-forming depressions 33 with the air-leading groove 32 are defined to be narrower, so that the heat-fusion can be easily and certainly carried out at the communicating parts 32A by the point-seal 50.

It is to be understood that the present invention is not intended to be limited to the above-described embodiment, and the following modifications lie within the scope of achieving the purposes of the present invention.

More specifically, it is not indispensable that each communicating part 32A of the bubble-forming depressions 33 should be narrower than the other parts, so that when each bubble 65 (its width) is relatively small, the widths of the whole bubble may be defined as the same. However, by forming as the aforementioned embodiment, although the bubbles 65 are large, if the widths of the communicating parts 32A are defined to be small, the heat-fusion seals at the communicating conjunction areas 64 can be certainly carried out.

And, the seal to form each independent bubble 65 is not limited to be located at the communicating conjunction area 64 between the communicating portion 62 and each bubble portion 63, and the seal may be carried out to close, for example, along the communicating portion (a part between the two communicating conjunction areas 64 in FIG. 5). In this case, a pair of the bubble portions 63 arranged in the right and left sides of communicating portion 62 forms one long bubble 65. The long bubbles 65 are guaranteed to have independence from the other long bubbles 65 next to one another.

Furthermore, the number of communicating portions 62 formed in a cycle of the films 23, 24 (the sheet 60) is not limited to be one but may be more than two, for example, the bubble portions 63 are formed in each right and left sides of the two communicating portions 62 to arrange the four bubbles 65 in the transverse direction of the sheet 60.

Meanwhile, in the aforementioned embodiment, the heat drum-roller 30 and the application rubber-roller 31 have respectively air-leading grooves 32, 35 in order to form the communicating portion 62 in the sheet 60, but one of the air-leading grooves 32, 35 may be omitted.

Figure 6:
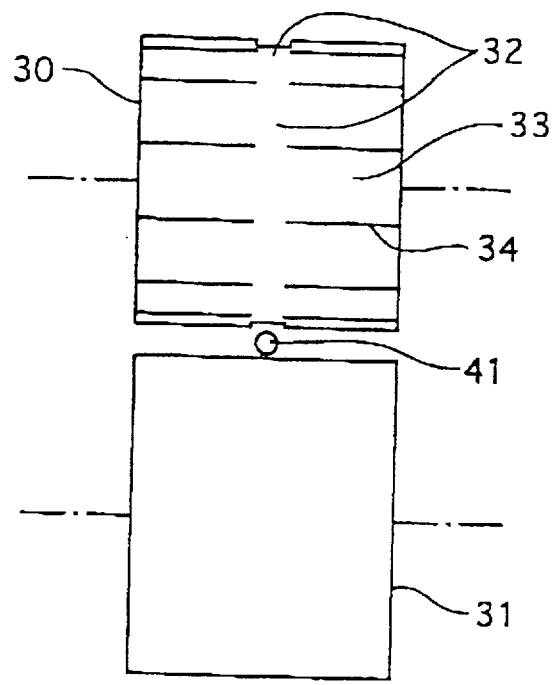
FIG. 6 is a side elevational view of a modification according to the present invention.

For instance, as shown in FIG. 6, although the application rubber-roller 31 is smoothly shaped, the communicating portion 62 will be formed by air-leading groove 32 on the heat drum-roller 30.

Figure 7:
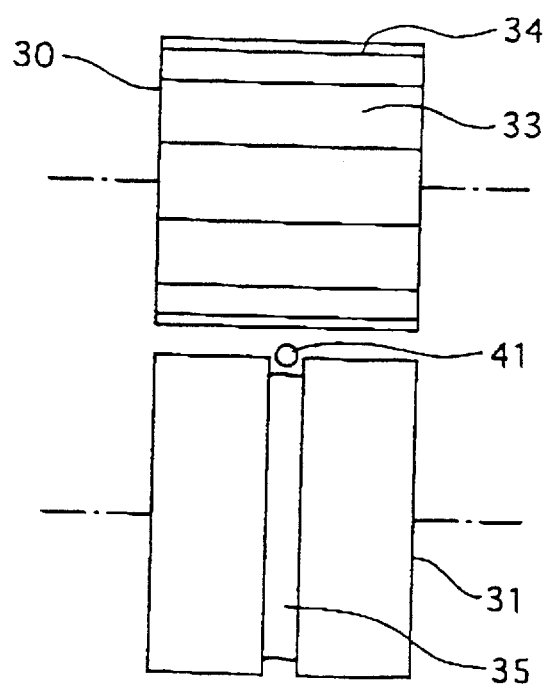
FIG. 7 is a side elevational view of another modification according to the present invention.

Alternatively, as shown in FIG. 7, even if only the bubble-forming depressions 33 are formed on the heat drum-roller 30, the communicating portion 62 will be formed if the air-leading groove 35 is formed on the application rubber-roller 31.

The air-blowing nozzle 40 is not limited to be adapted to reach to the application rubber-roller 30, for example, the air-blowing nozzle may jet the high pressure air stream from a position before the application rubber-roller 30 or before beginning to lay the two films 23, 24 one on top of another to the air-leading groove 32 or the end of the communicating portion 62. As a result, the bubbles 65 can be formed by maintaining the expansive state of each bubble portion 63 to blow the high pressure air into the communicating portion 62.

It is not limited that the opening 41 of the air-blowing nozzle 40 is adapted to be accommodated to the inside of the air-leading groove 35 on the application rubber-roller 31. When there isn't the air-leading groove 35 on the application rubber-roller 31, the opening 41 may be adapted to insert between the two films 23, 24 along the circumferential surface of the application rubber-roller 31 and then to reach into the air-leading groove 32 on the heat drum-roller 30.

The first heat-fusion means is not limited to be of a rotation type like the heat drum-roller 30, that is, a plain heat seal mold and so on can be used as the heat-fusion means and the sheet 60 is formed to be heat-fused at every predetermined distance while the two piled films 23, 24 are being intermittently sent. However, use of the heat drum-roller of the rotation type as the aforementioned embodiment effects a consecutive process, whereby the efficiency of production is progressed very well.

Incidentally, the aforementioned embodiment is structured to form the two bubbles 65 in the transverse direction, in which each pair of the bubbles branches to the right and left sides of the communicating portion 62, but the number and arrangement of bubbles are limited in the aforementioned embodiment, so that the number and arrangement of bubbles may be suitably selected to divide with the longitudinal direction seal and the transverse direction seal having the intermittent non-seal portions. And the sealing configuration on the circumferential surface of the heat drum-roller 30 may be suitably defined in response to the arrangement of the bubbles.

Figure 8:
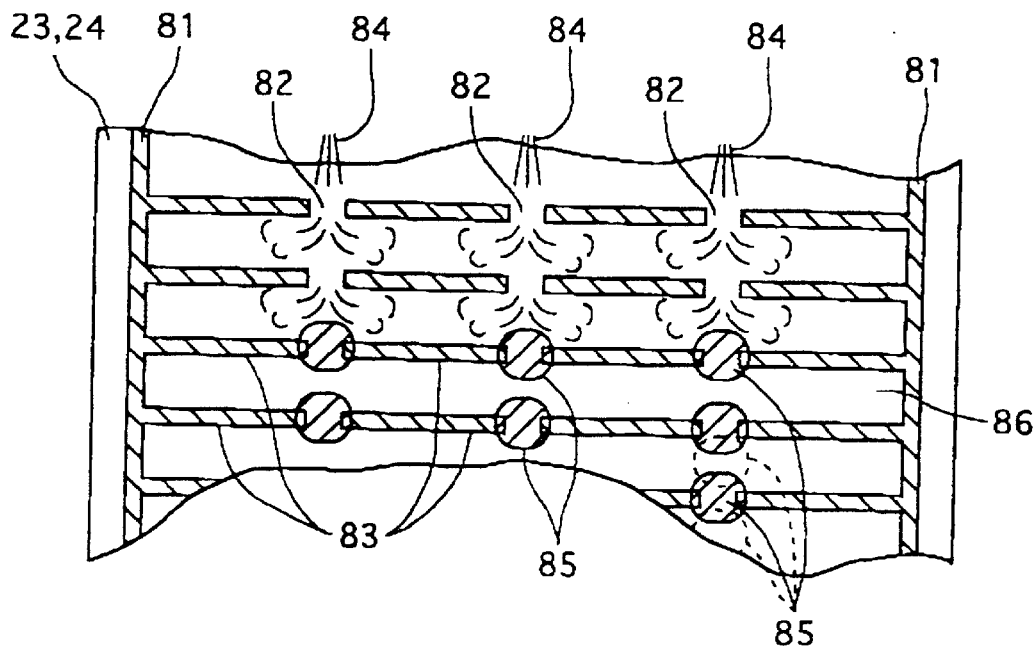
FIG. 8 is a plan view of another embodiment according to the present invention.

In FIG. 8, when the sent films 23, 24 laying one on top of the other are sealed by heat, the longitudinal direction seals 81 of the operating direction along both sides of each film and the transverse direction seals 83 having the intermittent non-seal portions, openings, 82 are formed, after which the intermittent portions 82 are closed by first point seals 85 while air 84 is being blown from the intermittent portions 82, thereby bubbles 86 having length in the transverse direction over the full width of the film are formed.

As shown in the bottom right of FIG. 8, the first point seals 85 are continuously formed to form second point seals 87 (illustrated with a dotted line in FIG. 8) that close the area between the two adjacent first point seals 85 (illustrated with hatching in FIG. 8), aligned in the operating direction, closing each intermittent portion 82, so that the aforementioned bubbles 86 are divided to be able to form a number of short bubbles 88.

Consequently, the bubbles 88 are changed in their length, for example, the two bubbles having a half width of the film in the transverse direction are arranged when the bubble is sealed at the center position of the three intermittent portions, the four bubbles having a quarter width of the film are arranged when the bubble is sealed at all these positions, and the one bubble having the half width and the two bubbles having the quarter width of the film are arranged when the bubble is sealed at two positions except the center position.

Thus, the bubbles 86 having full length in a film direction can be formed and also the bubbles 86 are easily sealed in a half, quarter or the like in length, that is, the requested bubbles 86, 88 are suitably formed.

Since the plural intermittent portions 82 are formed in the transverse direction seals 83, the opening width of each intermittent portion 82 can be smaller than one long intermittent portion 82 and closing by the point seal or the like can be smoothly and certainly carried out.

Figure 9:
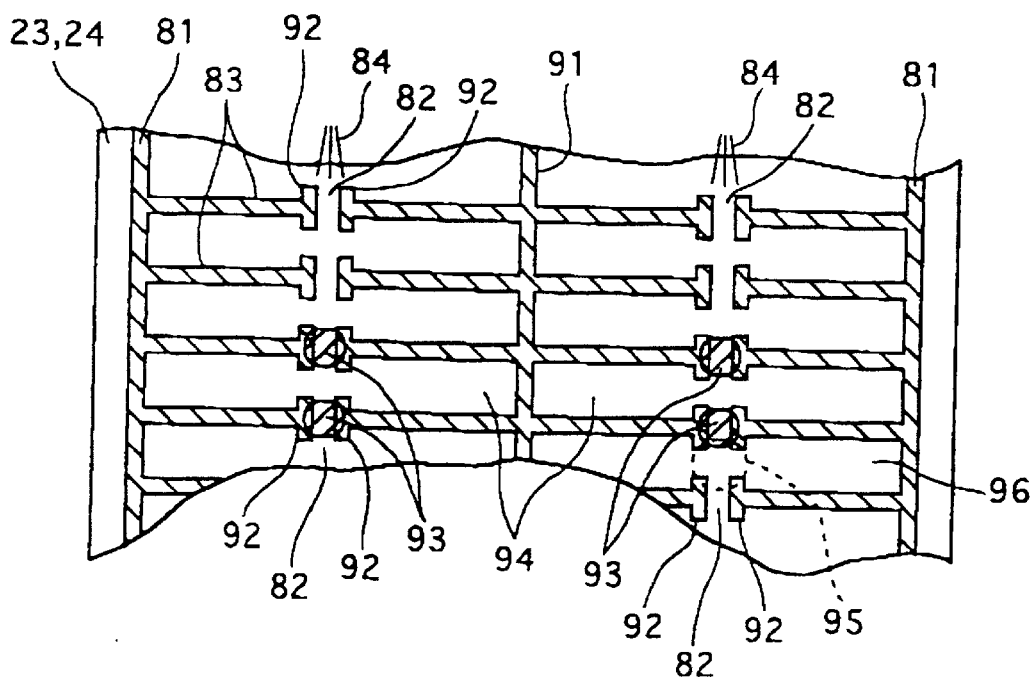
FIG. 9 is a plan view of further embodiments according to the present invention.

In FIG. 9, a sheet 90 based on the sheet 80 in FIG. 8 forms a longitudinal direction seal 91 sealed continuously in the film sending direction instead of the center intermittent non-seal portions, openings 82, forms two "a pair of longitudinal direction seals" with the center longitudinal direction seal 91 and the longitudinal direction seals 81 sealed at both sides of the films, and further forms short longitudinal direction seals 92 at both sides of each intermittent portion 82 near both sides of the films.

Incidentally, each longitudinal direction seal 92 is formed to have the same distance between the mutually adjacent longitudinal direction seals 92 in the operating direction as the width of the intermittent portion 82.

A space between the short longitudinal direction seals 92 in the film operating direction corresponds to the communicating portion 62 in the aforementioned embodiment, and each division enclosed with the longitudinal direction seals 83 in the both sides of the space and the longitudinal direction seals 81, 91 corresponds to the bubble portion 63 in the aforementioned embodiment, namely, the sheet 90 can be understood as the sheet added in the transverse direction to thereon have a further two lines with bubbles 65 in the aforementioned embodiment.

In the above sheet 90, the seals 81, 83, 91, and 92 are simultaneously formed when the films are heat-fused, and then the intermittent portions 82 are closed by a set of first point-seals 93 while the air 84 is being blown from the intermittent portions 82 (between the short longitudinal direction seals 92 of both sides of the intermittent portions 82, thereby the two long bubbles 94 having length in the half transverse direction of the films are formed on the same line in the film transverse direction.

Furthermore, if a set of second point-seals 95 (illustrated with a dotted line in the bottom right of FIG. 9) are formed to cover the four positions of the short longitudinal direction seals 92 by moving its position, the intermittent portions 82 can be closed although the aforementioned first point-seals 93 are omitted and further the four bubbles 96 having a quarter width of the films by dividing the aforementioned bubbles 94 having a half width of the films into two can be arranged on the same line in the film transverse direction.

The air cushion according to the present invention, there is no special limit but the film has a thickness of 20–10 μm, but preferably 30–70 μm, and a width of 30–200 cm, but preferably 40–120 cm. One bubble is almost a tube shape extending in the film direction transverse to the longitudinal direction and has a diameter of 10–50 mm, but preferably 20–40 mm and a length of more than 20 mm, in which a ratio of the length to the diameter is over 2, but preferably 3–20.

Industrial Availability

The present invention can be used for a cushioning material intended as a protection from colliding damage in transport and so on, in which the cushioning material is used to pack up into a packing box with something that is required to avoid having damage in packing, for example, electrical equipment, equipment for office automation, a precision instrument and a work of art.

We claim:

1. An air cushion comprising:
   two plastic films that are stacked together and that extend in an elongated direction; and
   at least two longitudinally extending seals and a plurality of transverse seals that extend between the plastic films to connect the plastic films together, the longitudinally extending seals extending in a longitudinal direction of the plastic films and the transverse seals extending between the longitudinally extending seals, wherein:
   the plastic films define bubbles that extend between the seals and that are expanded by air and the seals are further formed and arranged so that the bubbles have a length measured in a transverse direction of the plastic films that is at least twice the diameter of the bubbles measured in the longitudinal direction of the film; and
   each transverse seal is comprised of a plurality of first seal portions that are separated by at least one opening therebetween and at least one second seal portion that closes the at least one opening between the first seal portions.

2. The air cushion according to claim 1, wherein adjacent first seal portions of the transverse seals have ends that define the opening between the first seal portions and each second seal portion is connected to the ends of the first seal portions that define the opening closed by the second seal portion.

3. The air cushion according to claim 1, wherein the ends of the first seal portions are provided with supplemental seals that extend transverse to the first seal portions and the second seal portions are connected to the supplemental seals.

4. The air cushion according to claim 1, wherein the second seal portions of the transverse seals are arranged in a continuous pattern so that the second seal portions abut each other and extend across the bubbles so that the second seals further divide each bubble into at least two smaller bubbles.

5. The air cushion according to claim 4, wherein the ends of the first seal portions are provided with supplemental seals that extend transverse to the first seal portions and the second seal portions that close the openings between the first seal portions are connected to the supplemental seals.

6. A method for forming an air cushion comprising the steps of:
 selectively bonding two plastic films together to form at least two longitudinally extending seals and a plurality of transverse seals that extend between the longitudinally extending seals, wherein the transverse seals are interrupted by intermittent openings;
 blowing air into the intermittent openings so as to cause the expansion of the plastic films extending between the longitudinally extending seals and the transverse seals; and
 closing the intermittent openings so that the expanded plastic film forms an independent bubble that extends between the longitudinally extending seals and the transverse seals.

7. The method of forming an air cushion of claim 6, wherein when the longitudinally extending seals and the transverse seals are formed, supplemental seals are formed at the ends of the transverse seals that define the intermittent openings, the supplemental seals extending in the longitudinal direction around the intermittent openings.

8. The method for forming an air cushion according to claim 1, a further improvement comprising the step of sealing across the bubbles in a longitudinal direction to divide each bubble into a plurality of bubbles when the intermittent openings are closed.

9. The method for forming an air cushion according to claim 6, wherein the seals are spaced apart from each other so that the bubbles have a length measured in the transverse direction of the film that is at least twice their diameter measured in the longitudinal direction of the film.

10. The method for forming an air cushion according to claim 6, a further improvement comprising the step of using a heat drum-roller to bond the plastic films together, wherein the heat-drum roller has a circumferential surface along which an air-lead groove is formed, the air-lead groove being aligned with the intermittent openings when the longitudinal directional seals and the transverse seals are formed and wherein the heat-drum roller is continuously rotated.

11. The method for forming an air cushion according to claim 6 wherein:
 the plastic films are bonded together so that the longitudinal direction seals and the transverse seals define hollow bubble portions of plastic film that extend transversely across the film and that are arranged sequentially longitudinally along the film and, simultaneously with the formation of the hollow bubble portions, a communicating tube is formed by the film, said communicating tube extending longitudinally along the film and being in fluid communication with the hollow bubble portions so as to define the intermediate openings between the transverse seals;
 the blowing air step is performed by blowing air into the communicating tube so as to cause the expansion of the hollow bubble portions of the plastic film; and
 the closing step is performed by heat-fusing sections of the communicating tube closed to close the expanded hollow bubble portions of the plastic film.

12. The method for forming an air cushion according to claim 11, further comprising the step of using a heat drum-roller having plural bubble-forming depressions extending in an axial direction of the circumferential surface and a non-welding groove continuously cycled in the circumferential direction to communicate in conjunction with the bubble-forming depressions to form the longitudinal direction seals and the transverse seals.

13. An apparatus for producing an air cushion, comprising:
 film-feeding means for moving two plastic films in a forward direction;
 first heat-fusion means for receiving the plastic films from said film-feeding means for heat sealing the plastic films together to form at least two spaced apart longitudinally extending seals that extend in the direction in which the films are moved and a plurality of transverse seals that extend in a direction transverse to the direction in which the films are moved wherein the transverse seals are formed to define intermittent openings between the transverse seals;
 an air blowing nozzle for receiving air and directing the air into the intermittent openings to cause the expansion of sections film between the longitudinally extending seals and the transverse seals; and
 second heat-fusion means for heat fusing the intermittent openings closed so that the sections of expanded film form independent bubbles that extend between the longitudinally extending seals and the transverse seals.

14. The apparatus for producing the air cushion according to claim 13, wherein the first heat-fusion means is a heat drum-roller having a circumferential air-leading groove positioned to subtend the intermittent openings.

15. An apparatus for producing an air cushion, comprising:
 film-feeding means for moving two plastic films in a forward direction;
 first heat-fusion means for receiving the plastic films from said film-feeding means for heat sealing the plastic films together to form a plurality of hollow bubble portions which extend transverse to the direction in which the plastic films are moved and a communicating tube that is in fluid communication with the hollow bubble portions, the communicating tube extending in the direction in which the plastic films are moved;
 an air blowing nozzle for receiving air and blowing air into the communicating tube so as to cause the hollow bubble portions to fill with air and expand; and
 second heat-fusion means for heat-fusing the communicating tube closed to isolate the expanded bubble portions from each other.

16. The apparatus for producing the air cushion according to claim 15, wherein the first heat-fusion means is a heat drum-roller having a plurality of bubble-forming depressions that extend in an axial direction of a circumferential surface of the roller and a circumferentially extending air-leading groove that communicates with the bubble-forming depressions.

17. The apparatus for producing the air cushion according to claim 16, wherein the bubble-forming depressions are formed to have a narrower width adjacent the air-leading groove than the portions of the bubble-forming depressions distal from the air-leading groove.

* * * * *